United States Patent
McNamee

[11] 4,041,775
[45] Aug. 16, 1977

[54] VIBROMETER

[75] Inventor: James Arthur McNamee, Burlington, Mass.

[73] Assignee: RCA Corporation, New York, N.Y.

[21] Appl. No.: 562,772

[22] Filed: Mar. 27, 1975

[51] Int. Cl.² ............................................. G01H 1/00
[52] U.S. Cl. ........................................ 73/70.2; 73/67
[58] Field of Search .................. 73/70.2, 492, 514, 71, 73/67, 67.2, 71.2, 71.4; 116/114 AH

[56] References Cited
U.S. PATENT DOCUMENTS

| 1,727,991 | 9/1929 | Kimball, Jr. et al. | 73/71.1 |
| 2,063,790 | 12/1936 | Carbonara | 73/71.1 |
| 2,428,671 | 10/1947 | Kent et al. | 73/70.2 |
| 2,906,117 | 9/1959 | Kennard | 73/70.2 |
| 3,146,057 | 8/1964 | Rona | 73/70.2 X |
| 3,183,512 | 5/1965 | Castle | 116/114 AH |
| 3,504,533 | 4/1970 | Rodewalt | 73/71 |

FOREIGN PATENT DOCUMENTS

| 53,350 | 5/1967 | Poland | 73/514 |

*Primary Examiner*—Richard C. Queisser
*Assistant Examiner*—John P. Beauchamp
*Attorney, Agent, or Firm*—H. Christoffersen; Samuel Cohen; William Squire

[57] ABSTRACT

A plurality of circular cross section elongated vibrometer reeds each having a predetermined frequency response to a vibration in a given plane are secured to a vibration transmission medium in predetermined orientations. The medium is secured in vibrating communication with a machine frame, for example, a helicopter frame, to transmit frame vibrations to the reeds. Each reed is oriented to respond to at least one vibration associated with a known source of vibration in an environment of complex vibrations produced by a plurality of sources in the machine.

2 Claims, 7 Drawing Figures

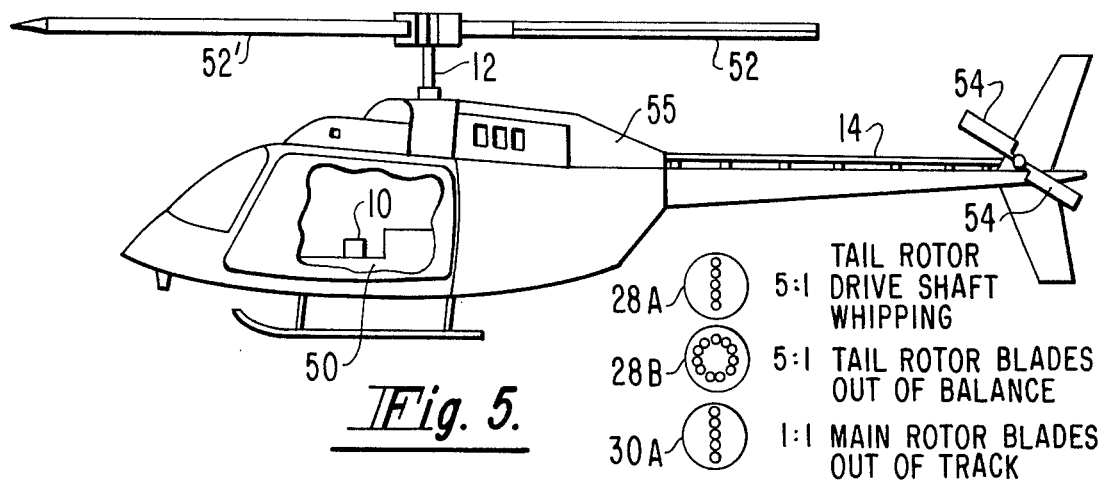
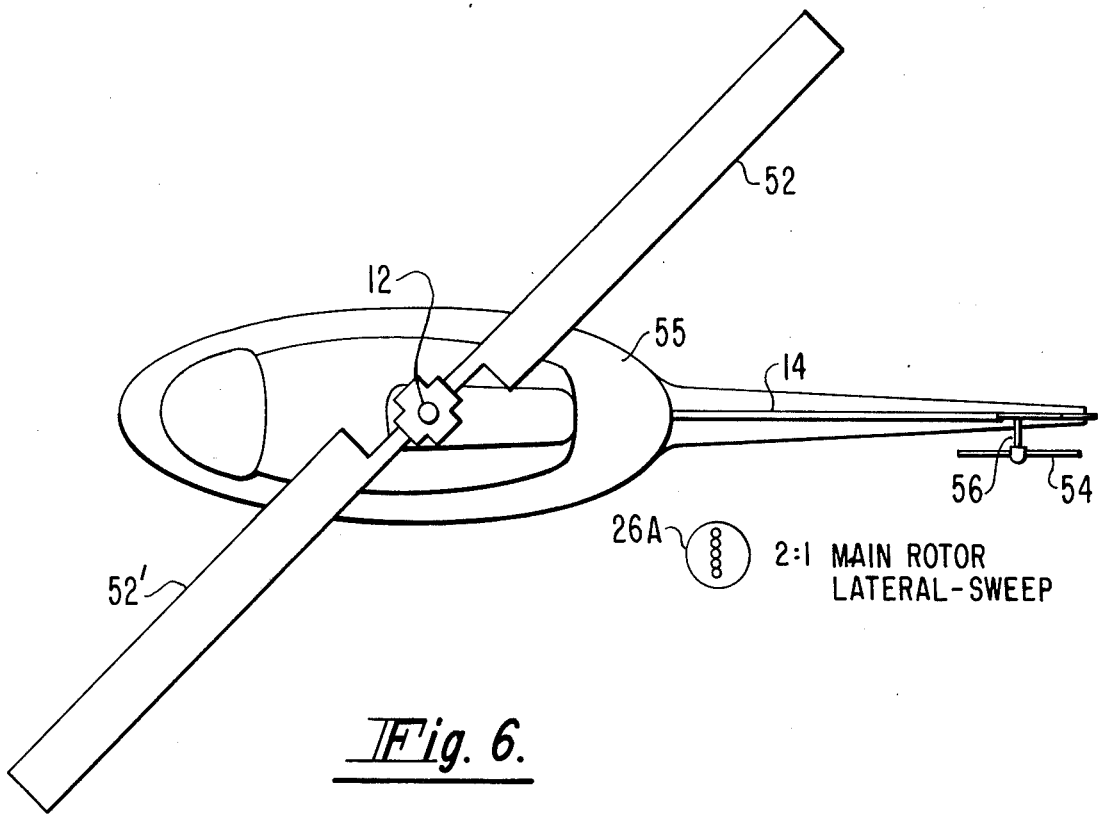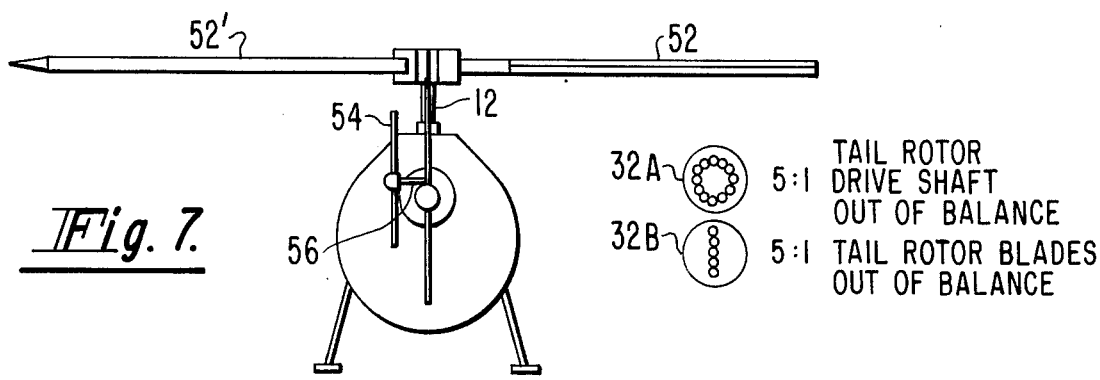

VIBROMETER

BACKGROUND OF THE INVENTION

The invention described herein was made in the course of, of under, a contract with the Department of the Army.

The present invention relates to devices for determining the mode and relative intensity of vibrations. A rotating shift, for example, may cause vibrations in several ways. First, an imbalance may be present in the shaft. That is, the mass rotated by the shaft including, but not limited to the shaft itself, may have the center of gravity offset from the axis of rotation. This offset mass when rotating sets up a mechanical oscillation which is transmitted to the associate machinery connected to or in mechanical communication with the shaft. This vibration is circular. That is, the oscillation motions follow a circular path.

Second, if a shaft is permitted to bend during rotation, a whipping action may occur. This is a linear reciprocating action and is distinguishable from a circular imbalance described above. These actions are respectively referred to herein as circular and linear modes. In addition, the frequency of the vibration is a factor to be considered. Certain imbalances produce a vibration that has the same frequency as the rotating shaft. Other imbalances may produce vibrations that are harmonics of the shaft rate. These different vibration rates may occur both in the linear or circular modes.

In complicated machinery wherein there are a plurality of rotating systems such as exist in a helicopter, there may be exhibited a number of vibrations of possible different frequencies and modes set up by each of the systems in accordance with the type of defect present in each system. For example, in a helicopter when the main rotor blades fail to track each other a 1:1 vertical vibration is generated. When the main rotor is out of balance, a lateral 2:1 vibration occurs. In addition, distinct vibrations are set up by the tail rotor drive shaft and the tail rotor blades. These different vibrations are difficult to detect and isolate.

SUMMARY OF THE INVENTION

A vibration device is used with a machine of the type having a first vibrating system and a second vibrating system and a main frame interconnecting the systems. The systems each vibrate at a given frequency in at least one plane disposed in a known orientation with respect to the plane of vibration of the other system. The device comprises a cylindrical, elongated vibratile element arranged to provide a calibrated indicated of vibration amplitude in a given plane at the given frequency. Means are provided for securing the element in vibrating communication with the main frame with the given plane oriented parallel to the one plane, the element providing an indication of the vibration amplitude of a selected one of the systems of the given frequency associated with the one plane.

IN THE DRAWINGS

FIGS. 5, 6 and 7 are various orientations of a helicopter employing the vibrometer of FIG. 1.

DETAILED DESCRIPTION

Figure 1:
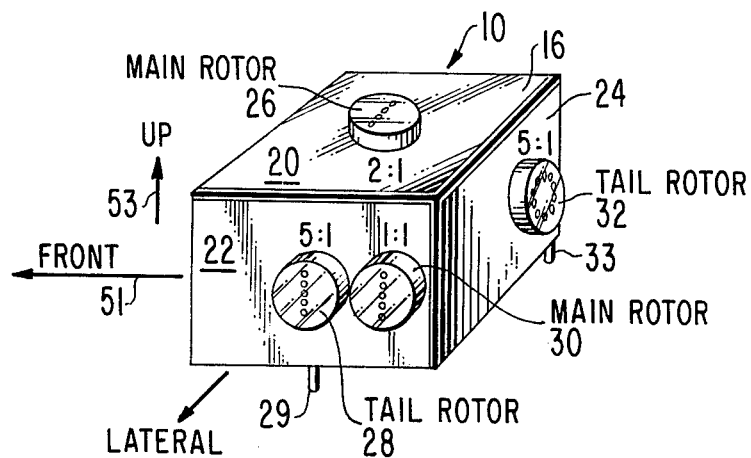
FIG. 1 illustrates an embodiment of a vibrometer constructed and operated in accordance with the present invention.

In FIG. 1 vibrometer 10 indicates the vibration amplitudes and modes of a plurality of vibration systems such as, for example, the main rotor 12 and tail rotor drive shaft 14 (FIG. 5) in a conventional helicopter 55, (FIGS. 5, 6 and 7). The helicopter 55 front is indicated by arrow 51 and the upward direction of rotor 12 is shown by arrow 53.

By vibrating system is meant asystem of one or more elements whether they be rotating, reciprocating or any combination thereof which produces vibrations. It is assumed that the system of interest is one of which a given vibration source has a predetermined vibrating force vector lying in a vibration plane. A vibration plane, therefore, is one in which the vector of the forcing vibration acts. Further, it is assumed that the particular vibration of interest is identifiable to a known source of vibration, i.e, a known defect produces an identifiable vibration. In particular, the vibration is identifiable by frequency and mode.

The vibrometer 10 in FIG. 1, includes a cubicle member 16 made of cast aluminum or other suitable vibration transmission material. That is, the material of member 16 is that which will transmit vibrations without significant attenuation and degradation. Member 16 has a first surface 20, a second surface 22 and a third surface 24 lying in and defining three orthogonal planes. These surfaces need not be planar as will become apparent in the following description but are so arranged for simplicity of illustration. Depending from member 16 are a plurality of device orienting pins 29 and 33. Pins 29 and 33 are keying pins disposed in any convenient arrangement such that member 16 can be secured to a mating member in only one orientation. Disposed in mechanical vibration communication with surfaces 20, 22 and 24 are vibrometer devices 26, 28, 30 and 32. Device 26 is mounted on surface 20, devices 28 and 30 are mounted on surface 22 and device 32 is mounted on surface 24. Each of the devices 26, 28, 30 and 32 are similar in construction and a typical construction of all the devices is given by the description of one of the devices 26 illustrated in FIG. 2.

Figure 2:
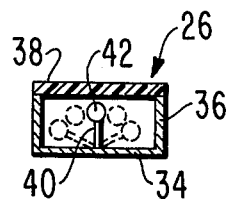
FIG. 2 shows further details of one of the vibrometer devices of FIG. 1.

In FIG. 2, device 26 comprises a base plate 34 made of a disk of metal or other material suitable for transmitting vibrations without substantial attenuation or degradation and a cylindrical enclosure wall 36 made of metal, thermoplastic or other suitable material. Wall 36 is secured to the periphery of base plate 34. Enclosing the opening formed by cylindrical wall 36 is transparent vibration calibration window 38. Window 38 is any suitable relatively rigid transparent material secured at the periphery thereof to the upstanding edge of wall 36. Vibratile element 40 is a vibrating reed and comprises an elongated cylindrical steel vibrating reed member which is secure at one end in mechanical vibrating communication with base plate 34 within wall 36. By vibrating communication is meant that vibrations are transferred from one member to another member without significant attenuation and degradation. There is no significant vibration damping occurring at the junction of the connection between two members. The other end of element 40 has a small spherical weight 42 secured thereto to provide momentum to element 40 as known in the vibrometer art. Element 40 and weight 42 together form a vibrating reed. Element 40 is centrally disposed on base plate 34 and when disposed in a static environment, element 40 and weight 42 are in a straight, erect position as shown solid in FIG. 2.

Element 40 is made cylindrical in cross section to effect particularly significant vibration responses. This configuration is essential to the device constructed and operated in accordance with the present invention. This cylindrical configuration results in element 40 being responsive to vibrations having an amplitude in any lateral direction transverse the longitudinal axis of the element. Additionally, the element is essentially not responsive to any vibration that is substantially in a direction parallel to the longitudinal axis. To this extent weight 42 has its center of gravity disposed along the longitudinal axis of element 40. As a result, no significant bending movements are induced in element 40 when weight 42 and element 40 are vibrated in a direction parallel to the element 40 longitudinal axis. These characteristics serve as an extremely useful vibration detection tool when the element 40 is oriented in a manner to be explained.

Figure 3:
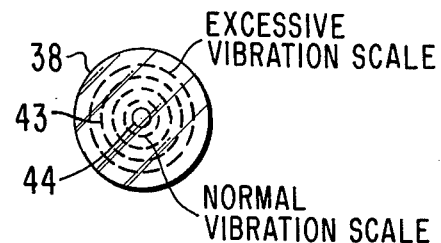
FIG. 3 illustrates calibration indicia for the device of FIG. 2.

FIG. 3 shows dotted calibration indicia 43 disposed on window 38. The indicia 43 comprise concentric dotted rings or other suitable visible marks disposed around the center of transparent window 38. The center of window 38 is disposed coaxial with element 40 and weight 42. In the absence of vibrations or motions, element 40 and weight 42 and central indicia 44 appear aligned as indicated by the solid central circle in FIG. 3. A normal vibration is indicated, for example, by the innermost dotted ring. Various increasing degrees of abnormal vibration are given in succession by the respective outer dotted rings.

As shown in FIG. 2, in dotted line, the extended end of element 40 including weight 42 tend to vibrate only in a vibrating environment having amplitudes substantially transverse the longitudinal axis of element 40, displacing weight 42 from the central erect position. In the presence of the transverse linear mode vibration, the weight 42 and element 40 appear in plan view to be vibrating in a straight line as indicated by devices 26, 28 and 30, FIG. 1. In the presence of a transverse rotational vibration or circular mode vibration, element 40 and weight 42 appear to rotate in a circular motion as illustrated by device 32 of FIG. 1. The combination of transverse linear and rotational motions cause the element 40 and weight 42 to traverse an elliptical course (not shown). The vibrating weight 42 is always visible through window 38 as a blurred image represented by the serial circles in devices 26, 28, 30 and 32 of FIG. 1.

The plane of each device 26, 28, 30 and 32 referred to herein is defined as the plane normal to the longitudinal axis of the corresponding vibrating element 40 (FIG. 2). This is the plane in which lies the vector of the forcing vibration to which element 40 responds. The plane of each device is oriented so that device responds to a particular vibration of interest. To this extent, the orientation of the devices 26, 28, 30 and 32 is exemplary only. In FIG. 1, the plane of the vibrometer device 26 is disposed orthogonal to the plane of devices 28, 30 and 32. The vibrating plane of devices 28 and 30 is orthogonal to the plane of vibrometer device 32. These orientations are arranged in accordance with particular known vibrations to be monitored in helicopter 55 of FIG. 5. Further, each element 40 of devices 26, 28, 30 and 32 is constructed to respond to a vibration of a given vibration frequency. To do so is within the skill of the art. In particular, these frequencies include 1N, 2N and 5N harmonics of the given frequency in the exemplary embodiment. The given frequency, in the instant embodiment, is the rate of rotation of the main rotor 12, FIG. 5, of helicopter 55. It should be apparent that the frequency response of the several devices 26, 28, 30 and 32 in general need not be harmonically related to each other, but to a particular frequency of vibration under investigation.

In providing a plurality of devices 26, 28, 30 and 32, in vibration communication with each other, it is evident that all the devices are subject to the same complex vibrations present in member 50 of helicopter 55, FIG. 5. The separate, independent orientation of each device 26, 28, 30 and 32 provides, in accordance with the present invention, a vibrometer that responds essentially to a selected vibration in the presence of these plurality of complex vibrations. By selected orientation of the devices, only certain ones of the devices respond to certain of the vibrations in a significant manner, i.e., amplitude of that vibration. It will be appreciated that significant vibrations and insubstantial minor vibrations not of interest can be distinguished by the amplitude of vibration under observation.

Addressing the problem of interacting harmonic inputs among devices 26, 28, 30 and 32, the device having a 1N response, i.e., device 30, is mounted perpendicular to the device having a 2N response, i.e., device 26. The 1N responsive device, i.e., device 30, is mounted for zero 2N harmonic inputs, i.e., parallel to the plane of the 2N inputs. The 5N harmonic inputs to the 1N and 2N devices, i.e., devices 30 and 26, respectively, is resolved by noting the 5N response level, i.e., the 5N input amplitudes, which are relatively small in relation to the 2N and 1N amplitudes. As should now be understood, the orientation of the response plane of a given device provides vibration detection isolation coupled with the fact that there is also frequency discrimination among the devices, i.e., 5N inputs to a 1N or 2N device will cause substantially reduced amplitudes in the 1N or 2N devices. These reduced amplitudes are readily observable as a 5N input by a skilled observer. Therefore, 5N inputs are amplitude distinguishable from 1N and 2N inputs in 1N and 2N devices. In the converse, a 5N device is not significantly responsive to 1N and 2N vibrations.

It should be appreciated that each element 40 is to be secured to member 16 in vibrating communication therewith. To this extent, the configuration of surfaces 20, 22 and 24 and the construction of member 16 generally is significant only to that degree necessary to provide good vibration communication between each element 40, member 16 and the member 50 (FIG. 5) whose vibrations are being monitored.

Figure 4:
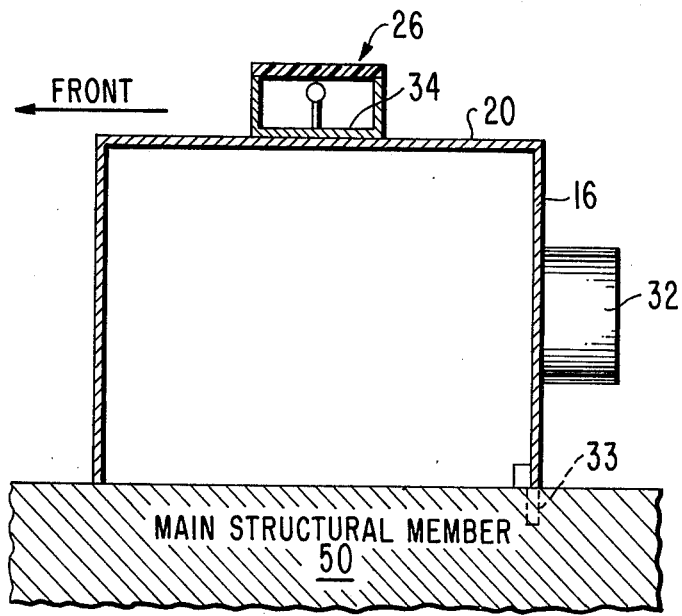
FIG. 4 shows further details of the embodiment of FIG. 1.

As shown in FIG. 4, device 26 is secured with base plate 34 secured in vibrating communication with top surface 20 of cubicle member 16. Member 16 being a hollow or solid member, as desired, is firmly secured in vibrating communication with the main structural member 50 whose vibrations are being monitored. This is achieved by screws, bolts or other suitable fastening devices (not shown). Structural member 50 and cubicle member 16 are constructed so that member 16 is accurately oriented when secured to member 50. This is achieved with suitable guide pins 29 and 33 which are received in corresponding guide pin recesses (not shown) in member 50. Guide pins 29 and 33 are arranged to key device 10 to member 50 in only one orientation. It will be appreciated that elements 40 of each device 26, 28, 30 and 32 may be secured in vibrating communication directly to frame 50 without the use of member 16 or base plate 34. In this case wall 36 is secured directly to frame 50 by suitable keying devices, not shown.

In FIG. 5, main structural member 50 supports the motor and accessory equipment (not shown) connected to rotor 12 of a conventional helicopter 55. Main structural memeber 50 is also a support for the drive mechanism for the tail rotor drive shaft 14. Main rotor 12 rotates the main rotor blades 52 and 52'. The tail rotor drive shaft 14 rotates the tail rotor blades 54 through the tail rotor shaft 56, FIG. 6. Rotor 12, drive shaft 14 and tail rotor shaft 56 are disposed orthogonal to each other.

In FIGS. 5, 6 and 7 the devices 26, 28, 30 and 32 of FIG. 1 are assigned the same number with a letter suffix to associate the orientation of the devices of FIGS. 5, 6 and 7 with the corresponding devices of FIG. 1. Devices with the same number designation regardless of the letter suffix are in fact one and the same device showing some of the different possible responses in accordance with vibration input. The orientation of the devices 26A, 28A, 28B, 30A, 32A and 32B of FIGS. 5, 6 and 7 correspond to the actual orientation of the device in the helicopter illustrated in the same drawing figure.

Device 26A, FIG. 6, is oriented with element 40 (FIG. 2) parallel to rotor 12. The main rotor 12 vibrates in a lateral direction, in and out of the drawing, FIG. 5, at a frequency of about twice the rate of rotation of the rotor 12. This is referred to in the helicopter art as a two-to-one lateral vibration. This vibration is related to the sweep adjustment of the main rotor blades 52 and 52'. By sweep is meant the displacement of oppositely disposed blades 52 and 52', FIG. 6, from an exact diametrically opposite position. The lateral vibrations produced by rotor 12 appear as a linear mode as shown by device 26A, FIG. 6.

Device 28 is oriented normal to tail rotor drive shaft 14 and parallel to tail rotor shaft 56 to respond to the tail rotor drive shaft 14 and tail rotor blades 54 vibrations. In FIG. 5, the vibrating element 40 of device 28A appears as a linear vertical line. This indicates that the tail rotor drive shaft 14 is whipping. Device 28 responds to a 5N or five-to-one vibration, that is, for every rotation of the main rotor 12 there are five vibrations in tail rotor drive shaft 14. If the tail rotor blades 54 are out of balance, also a 5N vibration, then device 28 of FIG. 1 indicates a circular mode vibration as shown by device 28B, FIG. 5. A vertical, linear mode indication by device 30A, FIG. 5, corresponds to a 1N or one-to-one vibration of the main rotor 12 and indicates the main rotor 12 is out of track. Out of track refers to one blade 52 not following the other blade 52'.

FIG. 7 shows a rear view of the helicopter 55 accompanying a corresponding view of devices 32A and 32B. Device 32A produces a circular mode indication in response to the tail rotor drive shaft 14 being out of balance. If the tail rotor drive shaft 14 and tail rotor blades 54 are out of balance, then an eliptical indication will be provided by the combined indications of devices 32A and 32B, FIG. 7, it being appreciated that devices 32A and 32B are, in practice, a single device 32 as shown in FIG. 1.

It will be appreciated that the devices 26, 28 and 30 each respond to a different vibration frequency. The several devices may respond to insubstantially higher orders of harmonics exhibiting significantly reduced amplitudes which are readily distinguishable. The calibration scale on window 38, FIG. 3, is provided by calibrating each device 26, 28, 30 and 32 with a conventional precalibrated vibration machine.

In operation, the helicopter has vibrometer 10 secured thereto in vibration communication therewith and in the orientation as discussed above. With the aircraft in flight, the aircraft is manuevered to different flight regimes including hover, take-off, landing, autorotation and the like. The elements 40 in vibrometer 10 are monitored visually, photographically or electrically in a suitable manner for responses that exceed normal levels. The vibration indicated by each of devices 26, 28, 30 or 32 indicated excessive vibration direct maintenance in the craft to those areas to which correction is required.

What is claimed is:

1. The combination of a helicopter and a system secured thereto for indicating the vibrating modes of the various rotors of the helicopter comprising, in combination:
   a plurality of vibration detectors each secured to the frame of the helicopter, each detector being positioned, dimensioned and secured to the frame in such a way as to be actuated substantially only by a particular vibratory mode of a particular rotor and to be substantially unaffected by vibratory modes of the other rotors; and
   indicator means for indicating the modes of vibration of the respective detectors for in turn indicating fault conditions of the rotors.

2. A method of testing, in flight, or on the ground the rotors of a helicopter comprising the steps of:
   concurrently and individually measuring the amplitudes and modes of vibration of the respctive rotors of the helicopter; and
   indicating, in response to the measurements, different fault vibratory conditions for each of the rotors.

* * * * *